US012658480B2

(12) United States Patent
Choi et al.

(10) Patent No.: US 12,658,480 B2
(45) Date of Patent: Jun. 16, 2026

(54) BIPOLAR STACK UNIT CELL STRUCTURE AND ALL-SOLID SECONDARY BATTERY INCLUDING THE SAME

(71) Applicant: Samsung SDI Co., Ltd., Yongin-si (KR)

(72) Inventors: Bokkyu Choi, Yongin-si (KR); Eungyeong Lee, Yongin-si (KR); Joowook Lee, Yongin-si (KR); Younggyoon Ryu, Yongin-si (KR); Jaegu Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 74 days.

(21) Appl. No.: 17/450,979

(22) Filed: Oct. 14, 2021

(65) Prior Publication Data

US 2022/0123369 A1 Apr. 21, 2022

(30) Foreign Application Priority Data

Oct. 20, 2020 (KR) ........................ 10-2020-0135895

(51) Int. Cl.
H01M 10/0585 (2010.01)
H01M 4/02 (2006.01)
(Continued)

(52) U.S. Cl.
CPC ....... H01M 10/0585 (2013.01); H01M 4/133 (2013.01); H01M 4/134 (2013.01); (Continued)

(58) Field of Classification Search
None
See application file for complete search history.

(56) References Cited

U.S. PATENT DOCUMENTS 9,705,156 B2 7/2017 Dorsch
10,270,135 B2 4/2019 Yamasaki et al.
(Continued)

FOREIGN PATENT DOCUMENTS

DE 102018218412 A1 * 4/2020 ........ H01M 10/0585
JP 2015-065033 A 4/2015
(Continued)

OTHER PUBLICATIONS

US 11,394,070 B2, 07/2022, Tanaka et al. (withdrawn)
(Continued)

*Primary Examiner* — Brian R Ohara
*Assistant Examiner* — M. T. Leonard
(74) *Attorney, Agent, or Firm* — Womble Bond Dickinson (US) LLP

(57) ABSTRACT

A bipolar stack unit cell structure includes: a bicell in which a first anode current collector, a first anode active material layer, a first electrolyte layer, a first cathode active material layer, a cathode current collector, a second cathode active material layer, a second electrolyte layer, a second anode active material layer, and a second anode current collector are sequentially arranged, wherein a plurality of the bicells are stacked, and a compression pad is provided between the first anode current collector and the second anode current collector of adjacent bicells of the plurality of bicells. The bipolar stack unit cell structure absorbs a volume change of an anode and suppresses or reduces a volume change of the entire cell to obtain a stable (or suitable) lifespan, and the capacity and voltage thereof can be freely (or suitably) designed by bipolar connection of the unit cells.

17 Claims, 6 Drawing Sheets

1

(51) Int. Cl.

| | |
|---|---|
| *H01M 4/133* | (2010.01) |
| *H01M 4/134* | (2010.01) |
| *H01M 4/38* | (2006.01) |
| *H01M 4/40* | (2006.01) |
| *H01M 4/587* | (2010.01) |
| *H01M 10/0525* | (2010.01) |
| *H01M 10/0562* | (2010.01) |

(52) U.S. Cl.

CPC ............. *H01M 4/38* (2013.01); *H01M 4/382* (2013.01); *H01M 4/405* (2013.01); *H01M 4/587* (2013.01); *H01M 10/0525* (2013.01); *H01M 10/0562* (2013.01); *H01M 2004/027* (2013.01); *H01M 2004/029* (2013.01); *H01M 2300/008* (2013.01)

(56) References Cited

U.S. PATENT DOCUMENTS

| | | | |
|---|---|---|---|
| 11,264,641 B2 | 3/2022 | Yamada et al. | |
| 11,594,717 B2 | 2/2023 | Suzuki et al. | |
| 2009/0023059 A1* | 1/2009 | Kinoshita | H01M 50/242 180/68.5 |
| 2009/0123833 A1* | 5/2009 | Mao | H01M 10/4235 429/163 |
| 2010/0290969 A1* | 11/2010 | Deiseroth | H01M 10/0562 423/303 |
| 2014/0087235 A1 | 3/2014 | Kajitani et al. | |
| 2016/0043430 A1* | 2/2016 | Lee | H01M 4/13 429/304 |
| 2018/0294510 A1* | 10/2018 | Kitaura | H01M 10/647 |
| 2018/0316065 A1 | 11/2018 | Hasegawa et al. | |
| 2018/0351159 A1* | 12/2018 | Fujiki | H01M 4/134 |
| 2019/0157723 A1* | 5/2019 | Suzuki | H01M 10/44 |
| 2019/0214677 A1* | 7/2019 | Yamada | H01M 4/661 |
| 2020/0287238 A1 | 9/2020 | Kang et al. | |
| 2020/0403266 A1* | 12/2020 | Hu | H01M 10/0585 |
| 2021/0367265 A1* | 11/2021 | Sugiyo | H01M 10/0562 |
| 2022/0123369 A1 | 4/2022 | Choi et al. | |
| 2022/0173428 A1* | 6/2022 | Morinaka | H01B 1/06 |

FOREIGN PATENT DOCUMENTS

| | | | | |
|---|---|---|---|---|
| JP | 2018120709 A | * | 8/2018 | .......... H01M 10/052 |
| JP | 2019-61861 A | | 4/2019 | |
| JP | 2019-121558 A | | 7/2019 | |
| JP | 2020-113415 A | | 7/2020 | |
| JP | 2020-136261 A | | 8/2020 | |
| JP | 2020-167146 A | | 10/2020 | |
| JP | 7494157 B2 | | 5/2024 | |
| KR | 10-2015-0059891 A | | 6/2015 | |
| KR | 10-2016-0064942 A | | 6/2016 | |
| KR | 10-1905167 B1 | | 10/2018 | |
| KR | 2019-0085458 A | | 7/2019 | |
| KR | 10-2100445 B1 | | 4/2020 | |
| WO | 2012-153866 A1 | | 11/2012 | |
| WO | WO-2019154438 A1 | * | 8/2019 | .......... H01M 50/497 |
| WO | WO-2020203231 A1 | * | 10/2020 | ............... H01B 1/10 |

OTHER PUBLICATIONS

DE102018218412A1 machine translation (Year: 2025).*

Japanese Office Action issued Nov. 28, 2022 in corresponding JP Patent Application No. 2021-170883 (3 pages).

Deiseroth H-J et al., "Li6PS5X: a class of crystalline Li-rich solids with an unusually high Li mobility", Angew. Chem. Int. Ed. (2008), 47(4), pp. 755-758, XP002514083; DOI: 10. I 002/anie.200703900 (4 pages).

LEE Yong-Gun et al., "High-energy long-cycling all-solid-state lithium metal batteries enabled by silver-carbon composite anodes", Nature Energy, Nature Publishing Group UK, London, (Mar. 9, 2020), 5(4), pp. 299-308, XP037523604 (10 pages).

Extended European Search Report issued Mar. 9, 2022, in corresponding EP Patent Application No. 21203101.7 (9 pages).

Japanese Office Action issued May 15, 2023, in corresponding JP Patent Application No. 2021-170883 (5 pages).

European Office Action dated Aug. 1, 2024, issued in corresponding European Patent Application No. 21203101.7 (5 pages).

* cited by examiner

BIPOLAR STACK UNIT CELL STRUCTURE AND ALL-SOLID SECONDARY BATTERY INCLUDING THE SAME

CROSS-REFERENCE TO RELATED APPLICATION

This application claims priority to and the benefit of Korean Patent Application No. 10-2020-0135895, filed on Oct. 20, 2020, in the Korean Intellectual Property Office, the entire content of which is incorporated herein by reference.

BACKGROUND

1. Field

One or more embodiments of the present disclosure relate to a bipolar stack unit cell structure and an all-solid secondary battery including the same.

2. Description of the Related Art

Recently, in response to industrial demands, batteries having high energy density and safety have been actively developed. For example, lithium-ion batteries are being used not only in the fields of information-related appliances and communication appliances, but also in the fields of automobiles. In the fields of automobiles, safety is especially important because it has an influence on driver safety.

Because commercially available lithium-ion batteries use an electrolyte including a flammable organic solvent, there is a possibility of overheating and fire when a short circuit occurs. In this regard, all-solid batteries using a solid electrolyte instead of an electrolyte have been proposed.

Because all-solid batteries do not use flammable organic solvents, even when a short circuit occurs, the possibility of fire or explosion may be greatly reduced. Accordingly, safety of such all-solid secondary batteries may greatly increase as compared with that of lithium-ion batteries.

Further, one of the characteristics of all-solid secondary batteries is that they can be relatively easily built with a bipolar structure, unlike comparable lithium-ion batteries, and thus the number of parts may be reduced, and large currents may flow easily, thus allowing the development of high-power, high-energy-density cells having high voltages. However, it is difficult to design a structure capable of absorbing a volume change due to a lithium deposition reaction used in the anode of an all-solid secondary battery.

SUMMARY

One or more aspects of embodiments of the present disclosure are directed toward a bipolar stack unit cell structure capable of absorbing a volume change of an anode (e.g., the anode comprising an anode current collector and an anode active material layer on the anode current collector).

One or more aspects of embodiments of the present disclosure are directed toward an all-solid secondary battery including the bipolar stack unit cell structure.

Additional aspects will be set forth in part in the description which follows and, in part, will be apparent from the description, or may be learned by practice of the presented embodiments of the disclosure.

According to one or more embodiments, a bipolar stack unit cell structure includes: a bicell in which a first anode current collector, a first anode active material layer, a first electrolyte layer, a first cathode active material layer, a cathode current collector, a second cathode active material layer, a second electrolyte layer, a second anode active material layer, and a second anode current collector are sequentially arranged, wherein a plurality of the bicells are stacked, and a compression pad is between the first anode current collector and second anode current of adjacent bicells of the plurality of bicells.

According to one or more embodiments, an all-solid secondary battery includes: the above-described bipolar stack unit cell structure, wherein a plurality of the bipolar stack unit cells are stacked.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
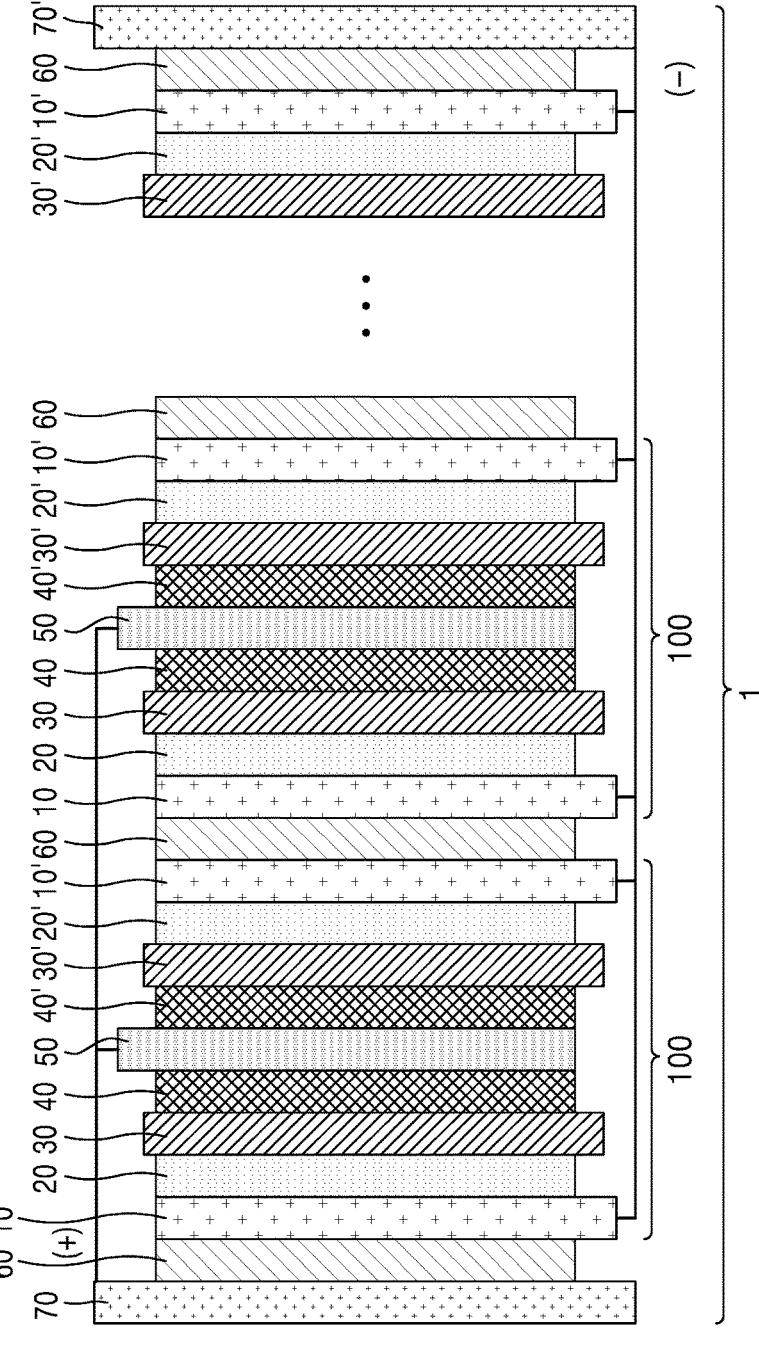
FIG. 1 is a schematic cross-sectional view of an electrode structure according to one or more embodiments.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," "one of", and "selected from", when preceding a list of elements, modify the entire list of elements and do not modify the individual elements of the list. Further, the use of "may" when describing embodiments of the present disclosure refers to "one or more embodiments of the present disclosure".

The present disclosure will now be described more fully with reference to the accompanying drawings, in which embodiments are illustrated. However, the present disclosure may be embodied in many different forms, should not be construed as being limited to the embodiments set forth herein, and should be construed as including all modifications, equivalents, and alternatives within the scope of the present disclosure.

The terms used herein is for the purpose of describing particular embodiments only and is not intended to be limiting of the disclosure. Singular expressions include plural expressions unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the thickness is enlarged or reduced in order to clearly express various layers and regions. Throughout the specification, the same reference numerals are attached to similar parts. Throughout the specification, when an element such as a layer, a film, a region or a component is referred to as being "on" another layer or element, it can be "directly on" the other layer or element (e.g., without any intervening layers therebetween), or intervening layers, regions, or components may also be present. Although the terms "first", "second", "third", etc., may be used herein to describe various elements, components, regions, and/or layers, these elements, components, regions, and/or layers should not be limited by these terms. These terms are used only to distinguish one component from another, not for purposes of limitation.

As used herein, the terms "use," "using," and "used" may be considered synonymous with the terms "utilize," "utilizing," and "utilized," respectively.

Spatially relative terms, such as "beneath," "below," "lower," "above," "upper," "bottom," "top" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinafter, a bipolar stack unit cell structure according to embodiments and an all-solid secondary battery including the same will be described in more detail.

It is difficult to design a structure capable of absorbing a volume change due to a lithium deposition reaction used in an anode of an all-solid secondary battery with a bipolar structure, and a current collector also uses expensive SUS, which also acts as a price increase factor.

In comparable all-solid secondary batteries, a structure in which stacked cells are placed in a bipolar structure to increase the capacity of a cell has been proposed, but a structure for absorbing a volume change has not been proposed.

Accordingly, the present disclosure is directed toward a bipolar stack unit cell structure for all-solid secondary batteries, capable of solving the above-described problems, and an all-solid secondary battery including the same.

Bipolar Stack Unit Cell Structure

A bipolar stack unit cell structure according to one or more embodiments includes:

a bicell in which a first anode current collector, a first anode active material layer, a first electrolyte layer, a first cathode active material layer, a cathode current collector, a second cathode active material layer, a second electrolyte layer, a second anode active material layer, and a second anode current collector are sequentially arranged, wherein a plurality of the bicells are stacked, and a compression pad is provided between the first anode current collector and second anode current of adjacent bicells of the plurality of bicells.

A bi-cell (or bicell) forming the bipolar stack unit cell structure of one or more embodiments has a C-type bicell structure in which one cathode layer on both sides of the cathode current collector and two anode layers as a single plate are symmetrical to each other. When a plurality of bicells are stacked, a compression pad is installed between adjacent bicells to absorb a volume change of the cathode layer in the bipolar stack unit cell structure. In the bipolar stack unit cell structure, because a compression pad capable of absorbing the volume change of the anode layer is provided, the volume change of the entire cell can be suppressed or reduced to obtain a stable lifetime, and stack and bipolar structures may be simultaneously (or concurrently) provided, so capacity and voltage can be freely designed.

FIG. 1 is a schematic cross-sectional view of a bipolar stack unit cell structure according to one or more embodiments.

As shown in FIG. 1, a bipolar stack unit cell structure 1 is a structure in which a plurality of bicells 100 are stacked, and each of the bicells 100 has a structure in which a first anode current collector 10, a first anode active material layer 20, a first electrolyte layer 30, a first cathode active material layer 40, a cathode current collector 50, a second cathode active material layer 40', a second electrolyte layer 30', a second anode active material layer 20', and a second anode current collector 10' are sequentially arranged. In the bipolar stack unit cell structure 1, the plurality of bi-cells 100 are stacked, and a compression pad 60 is provided between the first anode current collector 10 and the second anode current collector 10' of the adjacent bicells 100.

As shown in FIG. 1, a first bipolar plate 70 and a second bipolar plate 70' may be further provided on the first anode current collector 10 and the second anode current collector 10' positioned at both ends of the bipolar stack unit cell structure 1, respectively. In this case, the compression pads 60 may also be further provided between the first anode current collector 10 at one end of the bipolar stack unit cell structure 1 and the first bipolar plate 70, and between the second anode current collector 10' at another end of the bipolar stack unit cell structure 1 and the second bipolar plate 70'.

Compression Pad

The compression pads 60 provided between the first anode current collector 10 and the second anode current collector 10' of the adjacent bicells 100, between the first anode current collector 10 at the end of the bipolar stack unit cell structure 1 and the first bipolar plate 70, and between the second anode current collector 10' at another end of the bipolar stack unit cell structure 1 and the second bipolar plate 70' may be sheets made of an elastic material.

The elastic material may include at least one selected from polyurethane, natural rubber, spandex, butyl rubber (isobutylene isoprene rubber, IIR), fluoroelastomer, elastomer, ethylene-propylene rubber (EPR), styrene-butadiene rubber (SBR), chloroprene, elastin, rubber epi Chlorohydrin, nylon, terpene, isoprene rubber, polybutadiene, nitrile rubber, thermoplastic elastomer, silicone rubber, ethylene-propylene-diene rubber (EPDM), ethylene vinyl acetate (EVA), halogenated butyl rubber, neoprene, and copolymers thereof. However, the present disclosure is not limited thereto, and any suitable elastic material may be used without limitation as long as it has suitable elasticity. According to one or more embodiments, the compression pad 60 may be made of a urethane-based material, for example, polyurethane.

The compression pad 60 may be pressed to have a thickness of about 40% to about 90% of an initial thickness thereof before applying pressure. For example, the compression pad 60 may be pressed to have a thickness of about 50% to about 85%, about 60% to about 80%, or about 65% to about 75% of the initial thickness thereof before applying pressure. Because the volume change of the anode can be effectively (or suitably) absorbed within the above range, it is possible to smoothly charge and discharge an all-solid secondary battery.

The thickness of the compression pad 60 may be set in a range of about 200% to about 500% of a thickness of a lithium deposition layer of an anode formed when charging an all-solid secondary battery. In an all-solid secondary battery, the thickness of the lithium deposition layer of the anode is determined in proportion to the current density of the cathode. For example, the thickness of the lithium deposition layer of the anode is determined according to the amount of lithium moving from the cathode to the anode, and thereby the volume change of the anode occurs. Accordingly, the thickness of the compression pad 60 may be determined or set to absorb the volume change of the anode. Therefore, the thickness of the compression pad 60 may be set to be in a range of about 200% to about 500% of a thickness of a lithium deposition layer of the anode formed when charging an all-solid secondary battery, thereby effectively (or suitably) absorbing the voltage change of the anode. For example, the thickness of the compression pad 60 may be in a range of about 250% to about 450%, for example, about 300% to about 400% of a thickness of a lithium deposition layer of the anode formed when charging an all-solid secondary battery.

The thickness of the compression pad 60 may be set in the range of about 50 μm to about 300 μm, and in some case, may be set in the range of about 100 μm to about 150 μm, about 200 μm to about 300 μm, or about 50 μm to about 100 μm.

As such, because the compression pad 60 is provided between the anode current collectors, the volume change caused by a lithium (Li) deposition reaction used in the anode may be absorbed or reduced, and thus the volume change of the entire cell may be suppressed or reduced, thereby obtaining stable lifetime.

Cathode Layer

In the C-type bicell, the cathode layer includes a cathode current collector 50, and a first cathode active material layer 40 and a second cathode active material layer 40' disposed on both surfaces of the cathode current collector 50.

Cathode Active Material Layer: Cathode Active Material

The first and second cathode active material layers 40 and 40' include, for example, a cathode active material and a solid electrolyte. The solid electrolyte included in the first and second cathode active material layers 40 and 40' is similar to or different from the solid electrolyte included in the first and second electrolyte layers 30 and 30'. For more details of the solid electrolyte, refer to the description of the first and second electrolyte layers 30 and 30' provided herein.

The cathode active material is a cathode active material capable of reversibly absorbing and desorbing lithium ions. The cathode active material is, for example, a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), lithium manganate, lithium and iron phosphate, a nickel sulfide, a copper sulfide, a lithium sulfide, an iron oxide, a vanadium oxide, and/or the like, but is not limited thereto, and any suitable cathode active material in the art may be used. The cathode active materials may each independently be used alone or as a mixture of two or more thereof.

The lithium transition metal oxide is a compound represented by one of, for example, $Li_aA_{1-b}B_bD_2$ (where $0.90 \le a \le 1$, and $0 \le b \le 0.5$); $Li_aE_{1-b}B_bO_{2-c}D_c$ (where $0.90 \le a \le 1$, $0 \le b \le 0.5$, and $0 \le c \le 0.5$); $LiE_{2-b}B_bO_{4-c}D_c$ (where $0 \le b \le 0.5$, and $0 \le c \le 0.5$); $Li_aNi_{1-b-c}Co_bB_cD_\alpha$ (where $0.90 \le a \le 1$, $0 \le b \le 0.5$, $0 \le c \le 0.5$, and $0 \le \alpha \le 2$); $Li_aNi_{1-b-c}Co_bB_cO_{2-\alpha}F_\alpha$ (where $0.90 \le a \le 1$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1$, $0 \le b \le 0.5$, $0 \le c \le 0.05$, and $0 < \alpha < 2$); $Li_aNi_{1-b-c}Mn_bB_cD_\alpha$ (where $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}F_\alpha$ (where $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0$); $Li_aNi_bCo_cMn_dGeO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$, and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where, $0.90 \le a \le 1$ and $0.001 \le b \le 0.1$); $Li_aNi_bCo_cMn_dGeO_2$ (where, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1$ and $0.001 \le b \le 0.1$); $Li_aCoG_bO_2$ (where, $0.90 \le a \le 1$ and $0.001 \le b \le 0.1$); $Li_aMnG_bO_2$ (where, $0.90 \le a \le 1$ and $0.001 \le b \le 0.1$); $Li_aMn_2G_bO_4$ (where, $0.90 \le a \le 1$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and/or $LiFePO_4$. In the compound, A is Ni, Co, Mn, or a combination thereof; B is Al, Ni, Co, Mn, Cr, Fe, Mg, Sr, V, a rare earth element, or a combinations thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. A compound having a coating layer added on a surface thereof may be also used, and a mixture having the compound described above and a coating layer which are added thereto may be also used. The coating layer added to the surface of the compound includes, for example, a coating element compound of an oxide, a hydroxide, an oxyhydroxide, an oxycarbonate, and/or a hydroxycarbonate of the coating element. The compound forming the coating layer may be amorphous or crystalline. The coating elements included in the coating layer are selected from Mg, Al, Co, K, Na, Ca, Si, Ti, V, Sn, Ge, Ga, B, As, Zr, and mixtures thereof. A method of forming the coating layer is selected such that it does not substantially adversely affect properties of the cathode active material. The coating method is, for example, spraying, coating, and/or dipping. Because a coating method should be well understood by people skilled in the art, detailed descriptions thereof will not be provided.

The cathode active material includes, for example, a lithium salt of a transition metal oxide having a layered rock salt structure among the above-described lithium transition metal oxides. The "layered rock salt type structure", for example, is a structure wherein an oxygen atom layer and a metal atom layer are alternately and regularly arranged with each other in the direction of <111> of a cubic rock salt structure, whereby each atom layer forms a two-dimensional plane. "Cubic rock salt structure" refers to a sodium chloride like (NaCl like) structure, which is a type (or kind) of crystal structure in which face-centered cubic lattices (FCCs) forming each of cations and anions are arranged to be displaced from each other by ½ of a ridge of a unit lattice. A lithium transition metal oxide having the layered rock salt structure is a ternary lithium transition metal oxide, for example, $LiNi_xCo_yAl_zO_2$ (NCA) or $LiNi_xCo_yMn_zO_2$ (NCM) ($0<x<1$, $0<y<1$, $0<z<1$, $x+y+z=1$). When the cathode active material includes a ternary lithium transition metal oxide having a layered rock salt structure, the energy density and thermal stability of the all-solid secondary battery 2 are further improved.

The cathode active material may be covered by the coating layer as described above. The coating layer may be any suitable coating layer of the cathode active material of the all-solid secondary battery. The coating layer is, for example, $Li_2O$—$ZrO_2$ and/or the like.

When the cathode active material includes nickel (Ni) as a ternary lithium transition metal oxide (such as NCA and/or NCM), the capacity density of the all-solid secondary battery 2 is increased, whereby metal elution of the cathode active material in a charged state may be reduced. As a result, cycle characteristics in the charge state of the all-solid secondary battery 2 are improved.

The shape of the cathode active material is, for example, a sphere or an elliptical sphere. The particle diameter of the cathode active material is not particularly limited and is within a suitable range for an all-solid secondary battery. The content of the cathode active material in the cathode layer 10 is also not particularly limited and is within a suitable range for an all-solid secondary battery.

Cathode Active Material Layer: Solid Electrolyte

The first and second cathode active material layers 40 and 40' may include, for example, a solid electrolyte. The solid electrolyte included in the first and second cathode active material layers 40 and 40' may be the same as or different from the solid electrolyte included in the first and second electrolyte layers 30 and 30'. For more details of the solid electrolyte included in the first and second cathode active material layers 40 and 40', refer to the description of the solid electrolyte provided in connection with the first and second electrolyte layers 30 and 30'.

The solid electrolyte included in the first and second cathode active material layers 40 and 40' may have a smaller average particle diameter D50 than the solid electrolyte included in the first and second electrolyte layers 30 and 30'. For example, the average particle diameter D50 of the solid electrolyte included in the first and second cathode active material layers 40 and 40' may be 90% or less, 80% or less, 70% or less, 60% or less, 50% or less, 40% or less, 30% or less, or 20% or less of the average particle diameter D50 of the solid electrolyte included in the first and second electrolyte layers 30 and 30'.

The average particle diameter D50 is, for example, a median particle diameter D50. The median particle diameter D50 is, for example, a particle size corresponding to a 50% cumulative volume calculated from a particle having a small particle size in a particle size distribution measured by a laser diffraction method.

Cathode Active Material Layer: Binder

The first and second cathode active material layers 40 and 40' may include a binder. Examples of the binder may include, but are not limited to, styrene butadiene rubber (SBR), polytetrafluoroethylene, polyvinylidene fluoride, and polyethylene. However, any suitable binder may be used.

Cathode Active Material Layer: Conductive Material

The first and second cathode active material layers 40 and 40' may include a conductive material. Examples of the conductive material may include, but are not limited to, graphite, carbon black, acetylene black, Ketjen black, carbon fiber, and metal powder. However, any suitable conductive material may be utilized.

Cathode Active Material Layer: Other Additives

The first and second cathode active material layers 40 and 40' may further include additives such as a filler, a coating agent, a dispersing agent, and/or an ion-conductive auxiliary agent, in addition to the above-described cathode active material, solid electrolyte, binder, and conductive material.

As the filler, coating agent, dispersing agent and/or ion-conductive auxiliary agent included in the first and second cathode active material layers 40 and 40', suitable materials used for electrodes of all-solid secondary batteries may be used.

Cathode Layer: Cathode Current Collector

As the cathode current collector 50, for example, a plate, foil, and/or the like made of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof may be utilized. In one or more embodiments, the cathode current collector 50 may be omitted. The thickness of the cathode current collector 50 may be, for example, about 1 μm to about 100 μm, about 1 μm to about 50 μm, about 5 μm to about 25 μm, or about 10 μm to about 20 □ μm.

Electrolyte Layer

As shown in FIG. 1, the first electrolyte layer 30 and the second electrolyte layer 30' are disposed (e.g., positioned and/or provided) on the first cathode active material layer 40 and the second cathode active material layer 40', respectively. The first electrolyte layer 30 and the second electrolyte layer 30' may be solid electrolyte layers.

Solid Electrolyte Layer: Solid Electrolyte

The solid electrolyte may be, for example, a sulfide-based solid electrolyte. The sulfide-based solid electrolyte is, for example, at least one selected from $P_2S_5$, $Li_2S$—$P_2S_5$—LiX (where X is a halogen element, e.g., a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive number, and Z is one selected from Ge, Zn and Ga), $Li_2S$—$GeS_2$, $Li_2S$—$SiS_2$—$Li_3PO_4$, $Li_2S$—$SiS_2$—$Li_pMO_q$ (where p and q are each a positive number, and M is one selected from P, Si, Ge, B, Al, Ga, and In), $Li_{7-x}PS_{6-x}Cl_x$ ($0 \le x \le 2$), $Li_{7-x}PS_{6-x}Br_x$ ($0 \le x \le 2$), and $Li_{7-x}PS_{6-x}I_x$ ($0 \le x \le 2$). The sulfide-based solid electrolyte is prepared by treating a starting material such as $Li_2S$ and/or $P_2S_5$ by a melt quenching method and/or a mechanical milling method. After this treatment, heat treatment may be performed. The solid electrolyte may be amorphous, crystalline, or a mixed state thereof. The solid electrolyte may include sulfur (S), phosphorus (P), and/or lithium (Li) as at least constituent elements among the above-described sulfide-based solid electrolyte materials. For example, the solid electrolyte may be a material including $Li_2S$—$P_2S_5$. When a solid electrolyte including $Li_2S$—$P_2S_5$ as a material of the sulfide-based solid electrolyte forms the solid electrolyte, the mixing molar ratio of $Li_2S$ and $P_2S_5$ is, for example, in the range of about $Li_2S:P_2S_5=50:50$ to $90:10$.

The sulfide-based solid electrolyte may include, for example, an argyrodite-type solid electrolyte (e.g., an argyrodite solid electrolyte) represented by the following Formula 1:

$$Li^+_{12-n-x}A^{n+}X^{2-}_{6-x}Y^-_x \qquad \text{Formula 1}$$

In Formula 1, A is P, As, Ge, Ga, Sb, Si, Sn, Al, In, Ti, V, Nb or Ta; X is S, Se or Te; Y is Cl, Br, I, F, CN, OCN, SCN, or $N_3$; and $1 \le n \le 5$ and $0 \le x \le 2$ are satisfied. The sulfide-based solid electrolyte may be an argyrodite-type compound (e.g., an argyrodite compound) including at least one selected from $Li_{7-x}PS_{6-x}Cl_x$ ($0 \le x \le 2$), $Li_{7-x}PS_{6-x}Br_x$ ($0 \le x \le 2$), and $Li_{7-x}PS_{6-x}I_x$ ($0 \le x \le 2$). The sulfide-based solid electrolyte may be, for example, an argyrodite-type compound (e.g., an argyrodite compound) including at least one selected from $Li_6PS_5Cl$, $Li_6PS_5Br$, and $Li_6PS_5I$.

The density of the argyrodite-type solid electrolyte (e.g., the argyrodite solid electrolyte) may be about 1.5 g/cc to about 2.0 g/cc. When the argyrodite-type solid electrolyte (e.g., the argyrodite solid electrolyte) has a density of 1.5 g/cc or more, the internal resistance of the all-solid secondary battery may be reduced, and the penetration of the solid electrolyte by Li may be effectively (or suitably) suppressed or reduced.

Solid Electrolyte Layer: Binder

The solid electrolyte layer may include, for example, a binder. Examples of the binder included in the solid electrolyte layer may include, but are not limited to, styrene butadiene rubber (SBR), polytetrafluoroethylene, polyvinylidene fluoride, and polyethylene. However, any suitable binder may be used. The binder included in the solid electrolyte layer may be the same as or different from the binder included in the first and second cathode active material layers 40 and 40' and the first and second anode active material layers 20 and 20'. In some embodiments, the binder may be omitted.

The content (e.g., amount) of the binder included in the solid electrolyte layer may be about 0 wt % to about 10 wt %, about 0 wt % to about 5 wt %, about 0 wt % to about 3 wt %, about 0 wt % to about 1 wt %, about 0 wt % to about 0.5 wt %, or about 0 wt % to about 0.1 wt % with respect to the total weight of the solid electrolyte layer.

Anode Layer

As shown in FIG. 1, the first anode active material layer 20 and the second anode active material layer 20' are disposed on the first electrolyte layer 30 and the second electrolyte layer 30', respectively.

Anode Active Material Layer: Anode Active Material

The first and second anode active material layer 20 and 20' include, for example, an anode active material and a binder.

The anode active material included in the first and second anode active material layer 20 and 20' has, for example, a particle shape. The average particle diameter of the anode active material having a particle shape is, for example, 4 μm or less, 3 μm or less, 2 μm or less, 1 μm or less, or 900 nm or less. The average particle diameter of the anode active material having a particle shape is, for example, about 10 nm to about 4 μm, about 10 nm to about 3 μm, about 10 nm to about 2 μm, about 10 nm to about 1 μm, or about 10 nm to about 900 nm. When the anode active material has an average particle diameter in any of these ranges, reversible absorbing and/or desorbing of lithium may be easier during charging and discharging. The average particle diameter of the anode active material is, for example, a median diameter (D50) measured using a laser particle size distribution meter.

The anode active material included in the first and second anode active material layer 20 and 20' includes, for example, at least one selected from a carbon-based anode active material, a metal anode active material, and a metalloid anode active material.

In one or more embodiments, the carbon-based anode active material is amorphous carbon. Examples of amorphous carbon may include, but are not limited to, carbon black (CB), acetylene black (AB), furnace black (FB), ketjen black (KB), and graphene. Any suitable material may be used as long as it can be classified as amorphous carbon. Amorphous carbon is carbon that does not have crystallinity or has very low crystallinity, and is distinguished from crystalline carbon or graphite-based carbon.

The metal anode active material and the metalloid anode active material each independently include at least one selected from gold (Au), platinum (Pt), palladium (Pd), silicon (Si), silver (Ag), aluminum (Al), bismuth (Bi), tin (Sn), and zinc (Zn), but the present disclosure is not limited thereto. Any suitable material can be utilized as long as it can be used as a metal anode active material or a metalloid anode active material that forms an alloy or compound with lithium. For example, because nickel (Ni) does not form an alloy with lithium, it cannot be utilized as a metal anode active material.

The anode active material included in the first and second anode active material layer 20 and 20' may include an anode active material among the anode active materials described above, or a mixture of a plurality of different anode active materials. For example, the anode active material included in the first and second anode active material layer 20 and 20' may include only amorphous carbon, or may include at least one selected from gold (Au), platinum (Pt), palladium (Pd), silicon (Si), silver (Ag), aluminum (Al), bismuth (Bi), tin (Sn), and zinc (Zn). In one or more embodiments, the anode active material included in the first and second anode active material layer 20 and 20' may include a mixture of amorphous carbon and at least one selected from gold (Au), platinum (Pt), palladium (Pd), silicon (Si), silver (Ag), aluminum (Al), bismuth (Bi), tin (Sn), and zinc (Zn). The mixing ratio of the mixture of amorphous carbon and gold and/or the like is, for example, about 10:1 to about 1:2, about 5:1 to about 1:1, or about 4:1 to about 2:1 as a weight ratio, but is not necessarily limited to this range, and is selected according to the characteristics of the solid secondary battery 2. Because the anode active material has such a composition, cycle characteristics of the all-solid secondary battery 2 are further improved.

The anode active material included in the first and second anode active material layer 20 and 20' includes, for example, a mixture of first particles made of amorphous carbon and second particles made of metal or metalloid. Examples of the metal or metalloid may include gold (Au), platinum (Pt), palladium (Pd), silicon (Si), silver (Ag), aluminum (Al), bismuth (Bi), tin (Sn), and zinc (Zn). In one or more embodiments, the metalloid may be a semiconductor. The content (e.g., amount) of the second particles is about 8 wt % to about 60 wt %, about 10 wt % to about 50 wt %, about 15 wt % to about 40 wt %, or about 20 wt % to about 30 wt % based on the total weight of the mixture. When the second particle has a content within any of these ranges, for example, the cycle characteristics of the all-solid-state secondary battery 2 are further improved.

Anode Active Material Layer: Binder

Examples of the binder included in the first and second anode active material layers 20 and 20' may include, but are not limited to, styrene-butadiene rubber (SBR), polytetrafluoroethylene, polyvinylidene fluoride, polyethylene, vinylidene fluoride/hexafluoropropylene copolymers, polyacrylonitrile, and polymethyl methacrylate. However, any suitable binder may be utilized. The binder may be a single binder or a plurality of different binders.

Because the first and second anode active material layers 20 and 20' include a binder, the first and second anode active material layers 20 and 20' are stabilized on the first and second anode current collectors 10 and 10', respectively. Further, cracking of the first and second anode active material layers 20 and 20' is suppressed or reduced, despite a volume change and/or relative position change of the first and second anode active material layers 20 and 20' in the charging-discharging process. For example, when the first and second anode active material layers 20 and 20' do not include a binder, it is possible for the first and second anode active material layers 20 and 20' to be easily separated from the first and second anode current collectors 10 and 10'. When the first and second anode active material layers 20 and 20' are separated from the first and second anode current collectors 10 and 10', the first and second anode current collectors 10 and 10' come into contact with the solid electrolyte layers 30 and 30' at the exposed portions of the first and second anode current collectors 10 and 10', thereby increasing the possibility of a short circuit.

The first and second anode active material layers 20 and 20' are prepared by applying slurries, in which materials constituting the first and second anode active material layers 20 and 20' are dispersed, on the first and second anode current collectors 10 and 10' and drying the slurries, respectively. Because the binder is included in the first and second anode active material layers 20 and 20', it is possible to stably (or suitably) disperse the anode active material in the slurries. For example, when the slurries are respectively applied on the first and second anode current collectors 10 and 10' by a screen printing method, it is possible to suppress or reduce the clogging of a screen (for example, clogging by aggregates of the anode active material).

Anode Active Material Layer: Other Additives

The first and second anode active material layers 20 and 20' may further include additives for use in all-solid secondary batteries, for example, a filler, a coating agent, a dispersing agent, and/or an ion conductive auxiliary agent.

Anode Layer: Anode Active Material Layer

The thickness of each of the first and second anode active material layers 20 and 20' is, for example, 50% or less, 40% or less, 30% or less, 20% or less, 10% or less, or 5% or less of the thickness of each of the first and second cathode active material layers 40 and 40'. The thickness of each of the first and second anode active material layers 20 and 20' is, for example, about 1 μm to about 20 μm, about 2 μm to about 10 μm, or about 3 μm to about 7 μm. When each of the first and second anode active material layers 20 and 20' is too thin, lithium dendrites formed between each of the first and second anode active material layer 20 and 20' and each of the first and second anode current collectors 10 and 10' may collapse the first and second anode active material layers 20 and 20', so that it is difficult to improve the cycle characteristics of the all-solid secondary battery 2. When the thickness of each of the first and second anode active material layers 20 and 20' excessively increases, the energy density of the all-solid secondary battery 2 decreases, and the internal resistance of the all-solid secondary battery 2 by the first and second anode active material layers 20 and 20' increases, so that it is difficult to improve the cycle characteristics of the all-solid secondary battery 2.

When the thickness of each of the first and second anode active material layers 20 and 20' decreases, for example, the charging capacity of the each of the first and second anode active material layers 20 and 20' also decreases. The charging capacity of each of the first and second anode active material layers 20 and 20' is, for example, 50% or less, 40% or less, 30% or less, 20% or less, 10% or less, 5% or less, or 2% or less of the charging capacity of each of the cathode active material layers 40 and 40'. The charging capacity of each of the first and second anode active material layers 20 and 20' is, for example, about 0.1% to about 50%, about 0.1% to about 40%, about 0.1% to about 30%, about 0.1% to about 20%, about 0.1% to about 10%, about 0.1% to about 5%, or about 0.1% to about 2% of the charging capacity of each of the cathode active material layers 40 and 40'. When the charging capacity of each of the first and second anode active material layers 20 and 20' is too small, each of the first and second anode active material layers 20 and 20' becomes very thin. Therefore, lithium dendrites formed between each of the first and second anode active material layers 20 and 20' and each of the first and second anode current collectors 10 and 10' during repeated charging and discharging processes may collapse the first and second anode active material layers 20 and 20', so that it is difficult to improve the cycle characteristics of the all-solid secondary battery 2. When the charging capacity of each of the first and second anode active material layers 20 and 20' excessively increases, the energy density of the all-solid secondary battery 2 decreases, and the internal resistance of the all-solid secondary battery 2 by the first and second anode active material layers 20 and 20' increases, so that it is difficult to improve the cycle characteristics of the all-solid secondary battery 2.

The charging capacity of each of the first and second cathode active material layers 40 and 40' is obtained by multiplying the charging capacity density (mAh/g) of the cathode active material by the mass of the cathode active material in each of the first and second cathode active material layers 40 and 40'. When several types (or kinds) of cathode active materials are used, the values of charge capacity density×mass are calculated for respective cathode active materials, and the sum of these values is the charging capacity of each of the first and second cathode active material layers 40 and 40'. The charging capacity of each of the first and second anode active material layers 20 and 20' is calculated in the same way. For example, the charging capacity of each of the first and second anode active material layers 20 and 20' is obtained by multiplying the charging capacity density (mAh/g) of the anode active material by the mass of the anode active material in each of the first and second anode active material layers 20 and 20'. When several types (or kinds) of anode active materials are used, the values of charge capacity density×mass (the charge capacity density multiplied by mass values) are calculated for respective anode active materials, and the sum of these values is the charging capacity of each of the first and second anode active material layers 20 and 20'. Here, the charge capacity densities of the cathode active material and the anode active material are estimated using an all-solid half-cell using lithium metal as a counter electrode. The charging capacities of the first and second cathode active material layers 40 and 40' and the first and second anode active material layers 20 and 20' are directly measured by the measurement of the charging capacity using the all-solid half-cell. When the measured charge capacity is divided by the mass of each active material, the charging capacity density is obtained. In one or more embodiments, the charging capacities of the first and second cathode active material layers 40 and 40' and the first and second anode active material layers 20 and 20' may be initial charging capacities measured during the first charging cycle.

Anode Layer: Fourth Anode Active Material Layer

Although not shown in the drawings, in one or more embodiments, the bipolar stack unit cell structure 1 may further include a fourth anode active material layer disposed i) between the first anode current collector 10 and the first anode active material layer 20, ii) between the first anode active material layer 20 and the first electrolyte layer 30, iii) between the second electrolyte layer 30' and the second anode active material layer 20', and/or iv) between the second anode active material layer 20' and the second anode current collector 10'. The fourth anode active material layer is a metal layer including lithium or a lithium alloy. The metal layer includes lithium or a lithium alloy. Accordingly, because the fourth anode active material layer is a metal layer including lithium, it functions as, for example, a lithium reservoir. Examples of the lithium alloy may include, but are not limited to, a Li—Al alloy, a Li—Sn alloy, a Li—In alloy, a Li—Ag alloy, a Li—Au alloy, a Li—Zn alloy, a Li—Ge alloy, and a Li—Si alloy. Any suitable lithium alloy may be used. The fourth anode active material layer may be made of one of these alloys or lithium, or may be made of several kinds of alloys.

The thickness of the fourth anode active material layer is not particularly limited, but is, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness of the fourth anode active material layer is too thin, it is difficult for the second anode active material layer to serve as a lithium reservoir. When the fourth anode active material layer is too thick, the mass and volume of the bipolar stack unit cell structure 1 may increase, and the cycle characteristics thereof may be rather deteriorated. The fourth anode active material layer may be, for example, a metal foil having a thickness within any of these ranges.

In the bipolar stack unit cell structure 1, the fourth anode active material layer may be disposed between one of the first and second current collectors 10 and 10' and a corresponding one of the first and second anode active material layers 20 and 20' before assembly of the all-solid secondary battery 2, or may be deposited between one of the first and second current collectors 10 and 10' and a corresponding one of the first and second anode active material layers 20 and 20' by charging after assembly of the all-solid secondary battery 2. When the fourth anode active material layer is disposed between one of the first and second current collectors 10 and 10' and a corresponding one of the first and second anode active material layers 20 and 20' before assembly of the all-solid secondary battery 2, because the fourth anode active material layer is a metal layer including lithium, it functions as a lithium reservoir. For example, a lithium foil is disposed between each of the first and second current collectors 10 and 10' and each of the first and second anode active material layers 20 and 20' before assembly of the all-solid secondary battery 2. Thus, the cycle characteristics of the all-solid secondary battery 2 including the fourth anode active material layer are further improved. When the fourth anode active material layer is deposited by charging after assembly of the all-solid secondary battery 2, the fourth anode active material layer is not included during assembly of the all-solid secondary battery 2, so that the energy density of the all-solid secondary battery 2 increases. For example, when charging the all-solid secondary battery 2, the all-solid secondary battery 2 is charged to exceed the charging capacity of one (e.g., each) of the first and second current collectors 10 and 10'. For example, the first and second current collectors 10 and 10' are overcharged. At the initial stage of charging, lithium is absorbed in the first and second current collectors 10 and 10'. The anode active material included in the first and second current collectors 10 and 10' forms an alloy or compound with lithium ions that have migrated from the first and second cathode active material layers 40 and 40'. When the all-solid secondary battery 2 is charged to exceed the charging capacity of each of the first and second anode active material layers 20 and 20', for example, lithium is deposited on the rear surface of each of the first and second anode active material layers 20 and 20', for example, between each of the first and second current collectors 10 and 10' and each of the first and second anode active material layers 20 and 20', and a metal layer corresponding to the fourth anode active material layer is formed by the deposited lithium. The fourth anode active material layer is a metal layer mainly including lithium (e.g., metal lithium). Such a result is obtained, for example, when the anode active material included in the first and second anode active material layers 20 and 20' is composed of a material that forms an alloy or compound with lithium. During discharging, lithium in the first and second anode active material layers 20 and 20' and the fourth anode active material layer (the metal layer) is ionized and moves toward the first and second cathode active material layers 40 and 40'. Accordingly, it is possible to use lithium as an anode active material in the all-solid secondary battery 2. Further, because the first and second anode active material layers 20 and 20' cover the fourth anode active material layer, they each serve as a protective layer for the fourth anode active material layer (the metal layer), and serve to suppress or reduce the deposition growth of lithium dendrites. Therefore, the short circuit and capacity reduction of the all-solid secondary battery 2 are suppressed or reduced, and as a result, the cycle characteristics of the all-solid secondary battery 2 are improved. Further, when the fourth anode active material layer is disposed by charging after assembly of the all-solid secondary battery 2, the first and second current collectors 10 and 10' and the first and second anode active material layers 20 and 20' and the regions therebetween are, for example, Li-free regions that do not include lithium (Li) in the initial state or post-discharge state of the all-solid secondary battery.

Anode Layer: Anode Current Collector

The first and second anode current collectors 10 and 10' are made of, for example, a material that does not react with lithium, for example, does not form either an alloy or a compound with lithium. Examples of the material constituting the first and second anode current collectors 10 and 10' may include, but are not limited to, stainless steel, aluminum (Al), copper (Cu), titanium (Ti), iron (Fe), cobalt (Co), and nickel (Ni). However, any suitable material may be used as long as it can constitute an electrode current collector. The first and second anode current collectors 10 and 10' may be made of one of the above-described metals or an alloy of two or more metals, or may be made of a coating material. The first and second anode current collectors 10 and 10' are made in the form of a plate or foil.

The bipolar stack unit cell structure 1 may further include, for example, a thin film containing an element capable of forming an alloy with lithium on the first and second anode current collectors 10 and 10'. The thin film is disposed between one of the first and second anode current collectors 10 and 10' and a corresponding one of the first and second anode active material layers 20 and 20'. The thin film contains, for example, an element capable of forming an alloy with lithium. Examples of the element capable of forming an alloy with lithium may include, but are not limited to, gold, silver, zinc, tin, indium, silicon, aluminum, and bismuth. However, any suitable element may be used as long as it forms an alloy with lithium in the art. The thin film is formed of one of these metals or is formed of an alloy of several types (or kinds) of metals. As the thin film is disposed between the first and second anode current collectors 10 and 10', for example, the deposition form of the fourth anode active material layer deposited between the thin film and a corresponding one of the first and second anode active material layers 20 and 20' may be further flattened, and the cycle characteristics of the all-solid secondary battery 3 may be further improved.

The thickness of the thin film is, for example, about 1 nm to about 800 nm, about 10 nm to about 700 nm, about 50 nm to about 600 nm, or about 100 nm to about 500 nm. When the thickness of the thin film is less than 1 nm, it may be difficult to exert a function as the thin film. When the thickness of the thin film is too thick, the thin film itself absorbs lithium to decrease the amount of lithium deposited in an anode decreases, so that the energy density of the all-solid secondary battery 2 decreases, and the cycle characteristics of the all-solid secondary battery 3 may be deteriorated. The thin film may be disposed on the first and second anode current collectors 10 and 10' by, for example, a vacuum deposition method, a sputtering method, a plating method, and/or the like, but the present disclosure is not necessarily limited to these methods. Any suitable method capable of forming the thin film may be used.

All-Solid Secondary Battery

Figure 2:
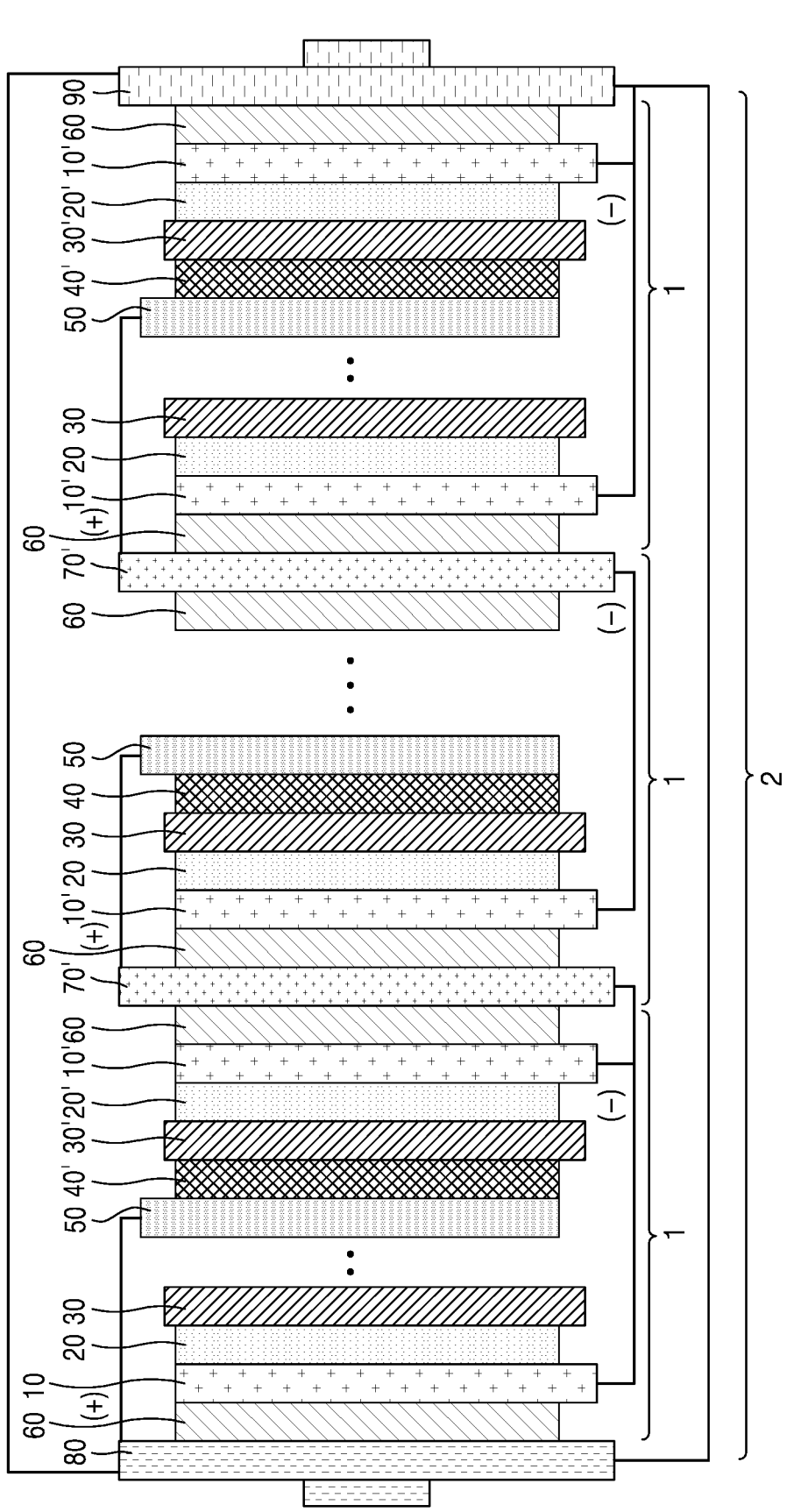
FIG. 2 is a schematic cross-sectional view of an all-solid secondary battery according to one or more embodiments.

FIG. 2 is a schematic cross-sectional view of an all-solid secondary battery according to one or more embodiments.

As shown in FIG. 2, the all-solid secondary battery 2 includes the bipolar stack unit cell structure 1, and has a structure in which a plurality of the bipolar stack unit cell structures 1 are stacked and connected (e.g., electrically coupled) in a bipolar manner. Bipolar plates 70 and 70' may be disposed between the bipolar stack unit cell structures 1. In the all-solid secondary battery 2, a desired voltage design may be performed by connecting (e.g., electrically coupling) the bipolar stack unit cell structures 1 in a bipolar manner, and a change in volume of the entire cell may be suppressed or reduced by the introduction of the compression pad 60.

The stacked bipolar stack unit cell 1 may further include a cathode terminal 80 and an anode terminal 90, and the compression pad 60 of the bipolar stack unit cell structure 1 may be in direct contact with the cathode terminal 80 and the anode terminal 90.

In one or more embodiments, a third cathode active material layer, a third electrolyte layer, a third anode active material layer, a third anode current collector and a compression pad may be further disposed sequentially from the cathode terminal 80 between the cathode terminal 80 and the first anode current collector 10 or the second anode current collector 10', adjacent to the cathode terminal 80, so that the third cathode active material layer may be in direct contact with the cathode terminal 80, and the compression pad 60 may be in direct contact with the anode terminal 90.

The present disclosure will be described in more detail through the following Examples and Comparative Examples. However, these examples are intended to illustrate the present disclosure, and the scope of the present disclosure is not limited thereto.

Example 1: Bipolar all-Solid Secondary Battery Including Compression Pad Manufacturing of Anode Layer A SUS (e.g., stainless steel) foil having a thickness of 10 μm was prepared as an anode current collector. Further, carbon black (CB) particles having a primary particle diameter of about 30 nm and silver (Ag) particles having an average particle diameter of about 60 nm were prepared as anode active materials.

4 g of mixed powder obtained by mixing carbon black (CB) particles and silver (Ag) particles in a weight ratio of 3:1 was put into a container, and 4 g of an NMP solution including 7 wt % of a PVDF binder (#9300 of KUREHA CORPORATION) was added thereto to prepare a mixed solution. Subsequently, the mixed solution was stirred while adding NMP dropwise to this mixed solution to prepare a slurry. The slurry was applied onto a SUS sheet using a bar coater, and dried in air at 80° C. for 10 minutes to obtain a laminate. The obtained laminate was dried in vacuum at 40° C. for 10 hours. The dried laminate was roll-pressed by a pressure of 300 MPa for 10 ms to flatten the surface of an anode active material layer of the laminate. An anode layer was manufactured by the above processes. The thickness of the anode active material layer included in the anode layer was about 7 μm.

Manufacturing of Cathode Layer $LiNi_{0.8}Co_{0.15}Mn_{0.05}O_2$ (NCM) coated with $Li_2O$—$ZrO_2$ (LZO) was prepared as a cathode active material. The LZO-coated cathode active material was prepared according to the method disclosed in Korean Patent Application Publication No. 10-2016-0064942 incorporated herein in its entirety by reference. $Li_6PS_5Cl$ (D50=0.5 μm, crystalline), which is argyrodite-type crystal (e.g., argyrodite crystal), was used as a solid electrolyte. A polytetrafluoroethylene (PTFE) binder (Teflon® binder of DuPont) was prepared as a binder. Carbon nanofibers (CNF) were prepared as a conducting agent. A cathode active material composition in which these materials are mixed with a xylene solvent at a weight ratio of cathode active material:solid electrolyte: conducting agent:binder=84:11.5:3:1.5 was molded into a sheet, followed by drying in vacuum at 40° C. for 8 hours to manufacture a cathode sheet. Two cathode sheets was pressed and attached to both surfaces of a cathode current collector made of a carbon-coated aluminum foil having a thickness of 18 μm to manufacture a cathode layer. The thickness of the cathode layer was about 105 μm.

Manufacturing of Solid Electrolyte Layer

Acrylic binder was added to a solid electrolyte $Li_6PS_5Cl$ (D50=3 μm, crystalline), which is argyrodite-type crystal (e.g., argyrodite crystal), in an amount of 1.5 parts by weight based on 98.5 parts by weight of the solid electrolyte to prepare a mixture. Subsequently, the prepared mixture was stirred while adding octyl acetate to this mixture to prepare a slurry. The slurry was applied onto a non-woven fabric using a bar coater, and dried in air at 80° C. for 10 minutes to obtain a laminate. The obtained laminate was dried in vacuum at 80° C. for 6 hours. A solid electrolyte layer was manufactured by the above processes.

Manufacturing of Bipolar Stack Unit Cell Structure

Referring to FIG. 1, the solid electrolyte layer was brought into contact with both sides of the cathode layer, the anode layer was placed on the solid electrolyte layer so as to contact the anode active material layer, and pressure was applied to prepare a C-type bicell. Subsequently, a polyurethane-made compression pad (Rogers Corp. PORON® microcellular #6040) having a thickness of 200 μm was placed between anode current collectors of the adjacent bicells, the cathode current collector of each bicell was welded to the bipolar plate (1) located at the outermost portion, and the anode current collector of each bicell was welded to the bipolar plate 2 to manufacture a bipolar stack unit cell structure.

Manufacturing of all-Solid Secondary Battery

Referring to FIG. 2, an all-solid secondary battery was manufactured by sequentially stacking the manufactured bipolar stack unit cell structures in an outer case.

Comparative Example 1: Bipolar all-Solid Secondary Battery Having No Compression Pad A bipolar all-solid second battery was manufactured in substantially the same manner as in Example 1, except that a compression pad was not placed between the anode current collectors of the adjacent bicells in Example 1.

Comparative Example 2: Monopolar all-Solid Secondary Battery Having No Compression Pad As a cathode layer, a cathode sheet formed on only one surface of the cathode current collector used in Example 1 was used, and a cathode layer and a solid electrolyte layer were the same as those in Example 1.

The anode layer, the solid electrolyte layer, and the cathode layer were sequentially arranged to prepare a laminate. The prepared laminate was plate-pressed by a pressure of 500 MPa for 1 min to prepare a unit cell of anode/solid electrolyte film/cathode to manufacture a monopolar all-solid secondary battery having no compression pad.

Evaluation Example 1: Charge-Discharge Test

The charge-discharge characteristics of the all-solid secondary batteries manufactured in Example 1 and Comparative Examples 1 and 2 were evaluated by the following charge-discharge test. The charge-discharge test was performed after putting the all-solid secondary battery into a thermostat bath at 45° C.

First, each of the all-solid secondary batteries of Example 1 and Comparative Examples 1 and 2 was charged with a constant current of 0.1 C until a voltage reached 4.25 V, and was then charged with a constant voltage until a current reached 0.05 C. After the charging was completed, the cell was subjected to a rest of about 10 minutes, and then subjected to constant current discharge at a current of 0.1 C until the voltage reached 2.5 V.

Figure 3:
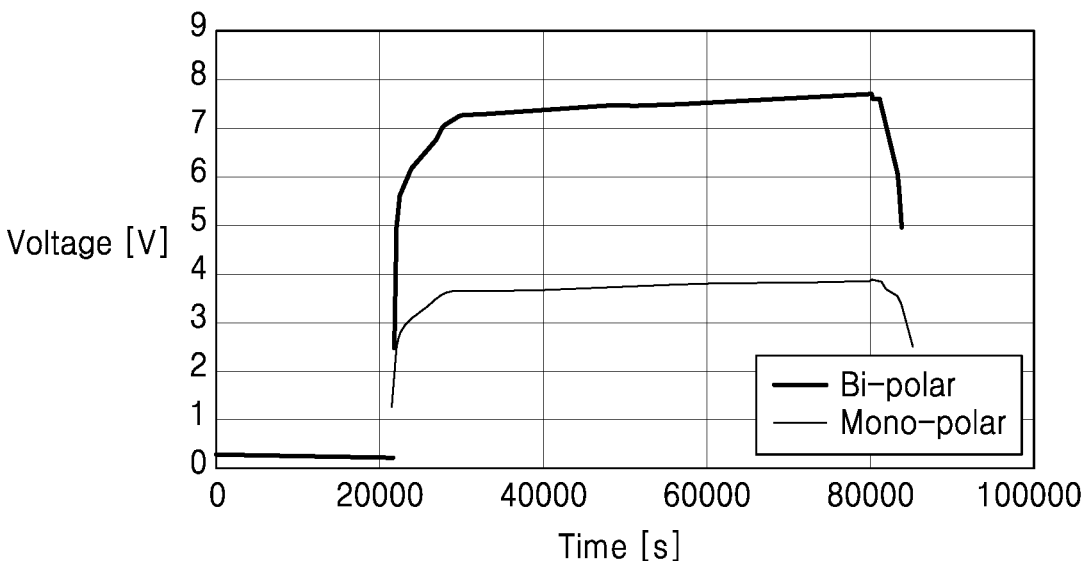
FIG. 3 is graph showing the possibility of a short circuit in bipolar and monopolar cells in the absence of a buffer pad.

FIG. 3 shows graphs of voltages of the all-solid secondary batteries of Comparative Examples 1 and 2 according to time. Here, the voltages refer to voltages of the bipolar cell of Comparative Example 1 and the monopolar cell of Comparative Example 2, respectively. As shown in FIG. 3, it may be found that the bipolar and monopolar all-solid secondary batteries having no compression pad cannot accommodate the volume expansion of the cell during charging, so that there is a high possibility of a short circuit occurring.

Figure 4:
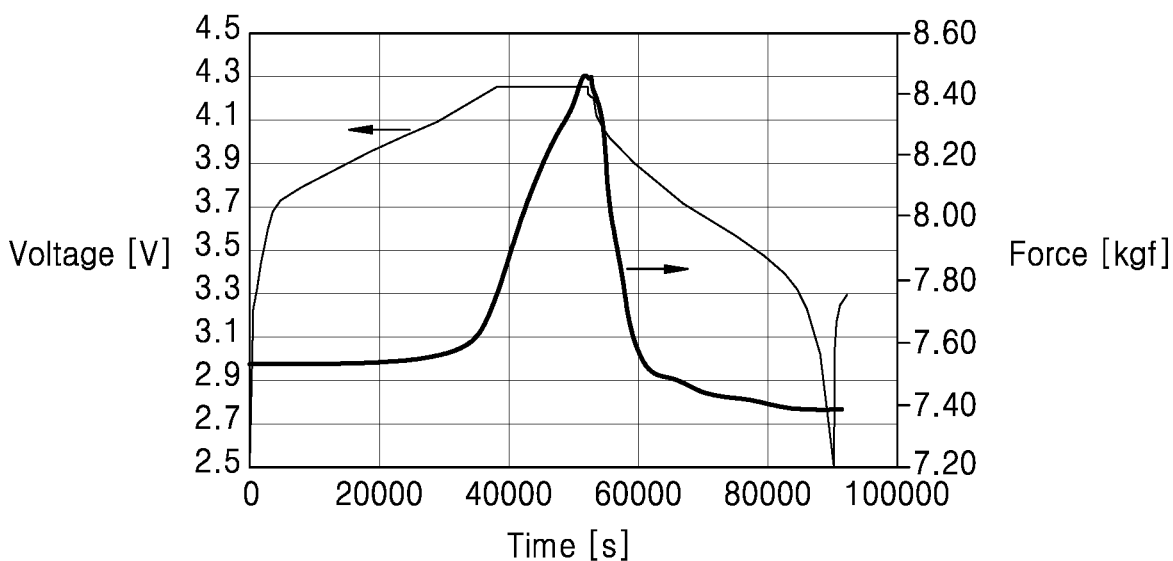
FIG. 4 is a graph showing data obtained by measuring volume expansion during charging of an all-solid secondary battery and volume contraction during discharging of the all-solid secondary battery using a load cell.

In contrast, FIG. 4 shows a graph of voltage and pressure of the all-solid secondary battery of Example 1 according to time. Here, the voltage refers to a voltage of the bipolar cell, and the pressure (force) refers to a force applied to the outer wall during volume expansion of the cell. As shown in FIG. 4, it may be found that the bipolar all-solid secondary battery of Example 1 in which a compression pad is provided between anode current collectors can be normally (or suitably) charged and discharged without occurrence of a short circuit even when the volume of the cell expands during charging.

Figure 5:
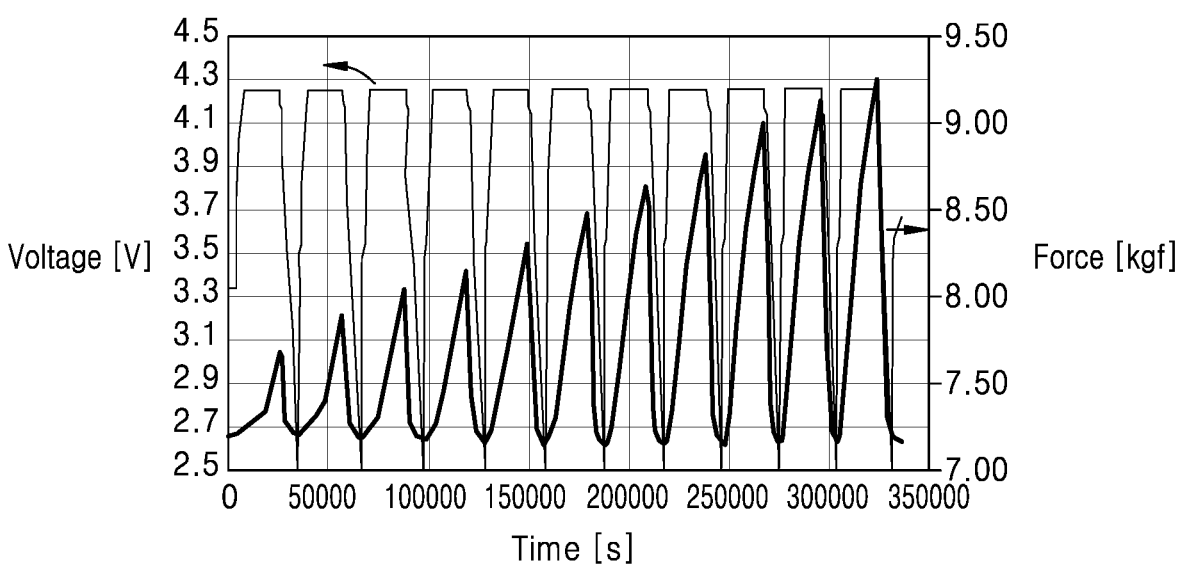
FIG. 5 is a graph showing data obtained by measuring the volume change of an all-solid secondary battery using a load cell during cycle evaluation at a high rate.

An additional charge-discharge test was performed on the all-solid secondary battery of Example 1 as follows, and the results thereof are shown in FIG. 5.

The all-solid secondary battery of Example 1 was charged with a constant current of 0.33 C until a voltage reached 4.25 V, and was then charged with a constant voltage until a current reached 0.05 C. After the charging was completed, the cell was subjected to a rest of about 10 minutes, and then subjected to constant current discharge at a current of 0.33 C until the voltage reached 2.5 V. This cycle was repeated 10 times, and the voltage and pressure according to time were evaluated.

As shown in FIG. 5, it may be found that in the bipolar all-solid secondary battery of Example 1 in which a compression pad is provided between anode current collectors, no short circuit occurred due to the repeating volume expansion and contraction of the battery during the cycle.

Evaluation Example 2: Evaluation Compression Stress

Figure 6:
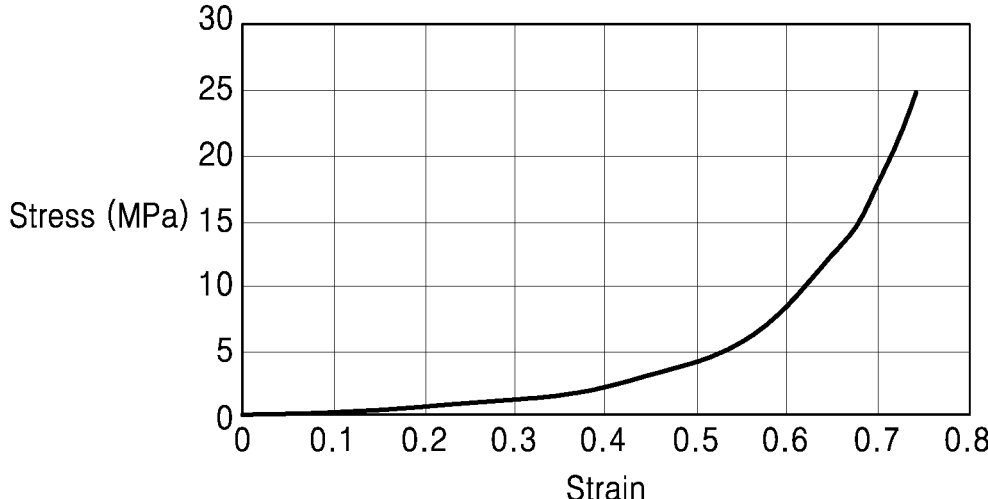
FIG. 6 is a graph showing data obtained by measuring the pressure that can be applied to the outside when a compression pad is contracted.

In order to evaluate the compression stress of the compression pads used in the all-solid secondary battery manufactured in Example 1 according to the type of installation, the compression stress of the compression pads with respect to compression strain was evaluated through a pellet density measuring instrument (PDMI), and the results thereof are shown in FIG. 6.

As shown in FIG. 6, the compression pad can be pressed toward the outside by contraction, and the pressing can be controlled within an appropriate (or suitable) pressure range even if there is a change in thickness through the initial thickness setting of the compression pad.

According to one or more embodiments of the present disclosure, the bipolar stack unit cell structure absorbs a volume change of an anode and suppresses or reduces a volume change of the entire cell to obtain a stable (or suitable) lifetime of a battery, and the capacity and voltage thereof can be freely (or suitably) designed by bipolar connection of the unit cells.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the following claims and their equivalents.

What is claimed is:

1. A bipolar stack unit cell structure comprising:
a bicell in which a first anode current collector, a first anode active material layer, a first electrolyte layer, a first cathode active material layer, a cathode current collector, a second cathode active material layer, a second electrolyte layer, a second anode active material layer, and a second anode current collector are sequentially arranged,
wherein a plurality of the bicells comprise the bicell and are stacked, and an insulating compression pad is between the first anode current collector and the second anode current collector of adjacent bicells of the plurality of bicells,
wherein each of the first anode current collector and the second anode current collector contacts the compression pad,
wherein each of the first electrolyte layer and the second electrolyte layer is a solid electrolyte layer and comprises a solid electrolyte, a binder, and an alkyl acetate, and
wherein the solid electrolyte is an argyrodite-type solid electrolyte having a density of about 1.5 to about 2.0 gram per cubic centimeter (g/cc) and is independently represented in the first and second electrolyte layers by Formula 1:

$$\mathrm{Li^+_{12-n-x}A^{n+}X^{2-}_{6-x}Y^-_x} \qquad \text{Formula 1}$$

A is As, Ge, Ga, Sb, Si, Sn, Al, In, Ti, V, Nb, or Ta;
X is S, Se, or Te;
Y is CI, Br, I, F. CN, OCN, SCN, or $N_3$;
$1 \leq n \leq 5$; and
$0 \leq x \leq 2$.

2. The bipolar stack unit cell structure of claim 1, further comprising:
a first bipolar plate on the first anode current collector and a second bipolar plate on the second anode current collector, the first anode current collector and the second anode current collector respectively being at corresponding ends of the bipolar stack unit cell structure,
wherein the compression pad is further between the first anode current collector at one of the ends of the bipolar stack unit cell structure and the first bipolar plate, and another compression pad is between the second anode current collector at another of the ends of the bipolar stack unit cell structure and the second bipolar plate.

3. The bipolar stack unit cell structure of claim 1, wherein the compression pad is made of an elastic material.

4. The bipolar stack unit cell structure of claim 3, wherein the elastic material comprises at least one selected from polyurethane, natural rubber, spandex, butyl rubber (isobutylene isoprene rubber, IIR), fluoroelastomer, elastomer, ethylene-propylene rubber (EPR), styrene-butadiene rubber (SBR), chloroprene, elastin, rubber epi Chlorohydrin, nylon, terpene, isoprene rubber, polybutadiene, nitrile rubber, thermoplastic elastomer, silicone rubber, ethylene-propylene-diene rubber (EPDM), ethylene vinyl acetate (EVA), halogenated butyl rubber, neoprene, and copolymers thereof.

5. The bipolar stack unit cell structure of claim 1, wherein the first anode active material layer and the second anode active material layer each independently comprise an anode active material and a binder, the anode active material has a particle form, and the anode active material has an average particle diameter of 4 μm or less.

6. The bipolar stack unit cell structure of claim 5, wherein the anode active material comprises at least one selected from a carbon-based anode active material, a metal anode active material, and a metalloid anode active material, and the carbon-based anode active material comprises amorphous carbon.

7. The bipolar stack unit cell structure of claim 6, wherein the metal anode active material and the metalloid anode active material each independently comprise at least one selected from gold (Au), platinum (Pt), palladium (Pd), silicon (Si), silver (Ag), aluminum (AI), bismuth (Bi), tin (Sn), and zinc (Zn).

8. The bipolar stack unit cell structure of claim 5, wherein the anode active material comprises a mixture of first particles of amorphous carbon and second particles of a metal or a metalloid, and
a content of the second particles is about 8 wt % to about 60 wt % based on a total weight of the mixture.

9. The bipolar stack unit cell structure of claim 1, further comprising: a fourth anode active material layer i) between the first anode current collector and the first anode active material layer, ii) between the first anode active material layer and the first electrolyte layer, iii) between the second electrolyte layer and the second anode active material layer, and/or iv) between the second anode active material layer and the second anode current collector, wherein the fourth anode active material layer is a metal layer, the metal layer comprising lithium or a lithium alloy.

10. An all-solid secondary battery comprising: the bipolar stack unit cell structure of claim 1,
wherein a plurality of the bipolar stack unit cell structures comprises the bipolar stack unit cell structure and are stacked, and the stacked plurality of bipolar stack unit cell structures are electrically coupled.

11. The all-solid secondary battery of claim 10, further comprising a cathode terminal and an anode terminal, respectively at ends of the stacked plurality of bipolar stack unit cell structures,
wherein, between the cathode terminal and the first anode current collector or the second anode current collector, adjacent to the cathode terminal, a third cathode active material layer, a third electrolyte layer, a third anode active material layer, a third anode current collector, and a compression pad are further arranged sequentially from the cathode terminal.

12. The bipolar stack unit cell structure of claim 1, wherein an average particle diameter D50 of a solid electrolyte in the first and second cathode active material layers is less than an average particle diameter D50 of a solid electrolyte in the first and second electrolyte layers.

13. The bipolar stack unit cell structure of claim 12, wherein the average particle diameter D50 of the solid electrolyte in the first and second cathode active material layers is 90% or less than the average particle diameter D50 of the solid electrolyte in the first and second electrolyte layers.

14. The bipolar stack unit cell structure of claim 12, wherein the average particle diameter D50 of the solid electrolyte in the first and second cathode active material layers is 50% or less than the average particle diameter D50 of the solid electrolyte in the first and second electrolyte layers.

15. The bipolar stack unit cell structure of claim 1, wherein the compression pad is to be pressed to have a thickness of about 40% to about 90% of an initial thickness thereof before being pressed, and a thickness of the compression pad is in a range of about 200% to about 500% of a thickness of a lithium deposition layer of an anode formed when charging an all-solid secondary battery.

16. The bipolar stack unit cell structure of claim 1, wherein the alkyl acetate is an octyl acetate.

17. A bipolar stack unit cell structure comprising:

a bicell in which a first anode current collector, a first anode active material layer, a first electrolyte layer, a first cathode active material layer, a cathode current collector, a second cathode active material layer, a second electrolyte layer, a second anode active material layer, and a second anode current collector are sequentially arranged, wherein a plurality of the bicells comprise the bicell and are stacked, and an insulating compression pad is between the first anode current collector and the second anode current collector of adjacent bicells of the plurality of bicells, wherein each of the first anode current collector and the second anode current collector contacts the compression pad, and wherein each of the first electrolyte layer and the second electrolyte layer independently comprises an argyrodite-type solid electrolyte having a density of about 1.5 gram per cubic centimeter (g/cc) to about 2.0 g/cc, and wherein the argyrodite-type solid electrolyte is independently represented in the first and second electrolyte layers by Formula 1:

$$Li^+_{12-n-x}A^{n+}X^{2-}_{6-x}Y^-_x \qquad \text{Formula 1}$$

A is As, Ge, Ga, Sb, Si, Sn, Al, In, Ti, V, Nb, or Ta;

X is S, Se, or Te;

Y is Cl, Br, I, F. CN, OCN, SCN, or $N_3$;

$1 \le n \le 5$; and $0 \le x \le 2$.

* * * * *